US011343706B2

(12) United States Patent
Stojanovski et al.

(10) Patent No.: US 11,343,706 B2
(45) Date of Patent: *May 24, 2022

(54) DEVICE REQUESTED PROTOCOL DATA UNIT SESSION MODIFICATION IN THE 5G SYSTEM

(71) Applicant: Apple Inc., Cupertino, CA (US)

(72) Inventors: Alexandre Saso Stojanovski, Paris (FR); Jerome Parron, Fuerth (DE); Sudeep K. Palat, Cheltenham (GB); Yujian Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/932,743

(22) Filed: Jul. 18, 2020

(65) Prior Publication Data

US 2020/0351702 A1    Nov. 5, 2020

Related U.S. Application Data

(63) Continuation of application No. 16/158,486, filed on Oct. 12, 2018, now Pat. No. 10,721,648.

(Continued)

(51) Int. Cl.
| | |
|---|---|
| *H04W 28/02* | (2009.01) |
| *H04L 69/22* | (2022.01) |
| *H04W 28/06* | (2009.01) |
| *H04W 76/20* | (2018.01) |
| *H04W 76/10* | (2018.01) |
| *H04L 67/14* | (2022.01) |

(Continued)

(52) U.S. Cl.
CPC ......... *H04W 28/0268* (2013.01); *H04L 67/14* (2013.01); *H04L 67/146* (2013.01); *H04L 69/22* (2013.01); *H04W 28/0257* (2013.01); *H04W 28/065* (2013.01); *H04W 76/10* (2018.02); *H04W 76/20* (2018.02); *H04L 47/32* (2013.01)

(58) Field of Classification Search
CPC ....... H04L 47/32; H04L 67/14; H04L 67/146; H04L 69/22; H04W 28/0257; H04W 28/0263; H04W 28/0268; H04W 28/065; H04W 76/10; H04W 76/20
USPC ......................................................... 370/235
See application file for complete search history.

(56) References Cited

U.S. PATENT DOCUMENTS

| | | | |
|---|---|---|---|
| 2017/0238342 A1* | 8/2017 | Yang | H04W 72/087 370/329 |
| 2017/0288886 A1* | 10/2017 | Atarius | H04L 65/1063 |

(Continued)

*Primary Examiner* — Robert J Lopata

(74) *Attorney, Agent, or Firm* — Kowert, Hood, Munyon, Rankin & Goetzel, P.C.

(57) ABSTRACT

Systems and methods of segregating a SDF of a PDU session are described. The UE transmits a NAS message to the network. The NAS message indicates the SDF, the desired QoS, and a segregation indication that requests that the network establish a separate QoS flow for the SDF even if an existing QoS flow is able to support the specific QoS. The SF decides whether or not to establish the separate QoS flow and updates filters in the UPF as well as providing a response to the UE containing a similar indication. The UE modifies resources related to the PDU session based on the response. The QoS is indicated as a 5QI and GBR or as a QFI of an existing QoS Flow on which the SDF is to be added if the separate QoS is not established. The QFI is in an unencrypted SDAP header of the NAS message.

20 Claims, 8 Drawing Sheets

Related U.S. Application Data

(60) Provisional application No. 62/571,671, filed on Oct. 12, 2017.

(51) Int. Cl.
*H04L 67/146* (2022.01)
*H04L 47/32* (2022.01)

(56) References Cited

U.S. PATENT DOCUMENTS

| | | | |
|---|---|---|---|
| 2018/0198867 A1* | 7/2018 | Dao | H04L 67/143 |
| 2018/0324633 A1* | 11/2018 | Lee | H04L 47/2425 |
| 2019/0098692 A1* | 3/2019 | Atarius | H04W 48/16 |
| 2019/0116518 A1* | 4/2019 | Stojanovski | H04W 28/0257 |
| 2019/0253917 A1* | 8/2019 | Dao | H04L 12/1407 |
| 2019/0253938 A1* | 8/2019 | Sayenko | H04W 92/20 |
| 2019/0254118 A1* | 8/2019 | Dao | H04L 12/1407 |
| 2019/0274178 A1* | 9/2019 | Salkintzis | H04W 76/16 |
| 2020/0008118 A1* | 1/2020 | Han | H04W 36/08 |
| 2020/0022213 A1* | 1/2020 | Han | H04W 28/0268 |
| 2020/0037205 A1* | 1/2020 | Ying | H04W 28/22 |
| 2020/0120589 A1* | 4/2020 | Velev | H04W 76/25 |

\* cited by examiner

DEVICE REQUESTED PROTOCOL DATA UNIT SESSION MODIFICATION IN THE 5G SYSTEM

PRIORITY CLAIM

This application is a continuation of U.S. patent application Ser. No. 16/158,486, entitled "DEVICE REQUESTED PROTOCOL DATA UNIT SESSION MODIFICATION IN THE 5G SYSTEM", which claims the benefit of priority to U.S. Provisional Patent Application Ser. No. 62/571,671, filed Oct. 12, 2017, which are incorporated herein by reference in their entirety.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

TECHNICAL FIELD

Embodiments pertain to radio access networks (RANs). Some embodiments relate to cellular and wireless local area network (WLAN) networks, including Third Generation Partnership Project Long Term Evolution (3GPP LTE) networks and LTE advanced (LTE-A) networks as well as legacy networks, $4^{th}$ generation (4G) networks and $5^{th}$ generation (5G) networks. Some embodiments relate to quality of service (QoS) for service data flows (SDFs).

BACKGROUND

The use of various types of systems has increased due to both an increase in the types of devices user equipment (UEs) using network resources as well as the amount of data and bandwidth being used by various applications, such as video streaming, operating on these UEs. To increase the ability of the network to contend with the explosion in network use and variation, the next generation of communication systems is being created. While the advent of any new technology, especially the introduction of a complex new communication system engenders a large number of problems both in the system itself and in compatibility with previous systems and devices, issues continue to abound in existing systems. One such problem arises from the modification of QoS flows when 5G systems and devices are used.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

Figure 1:
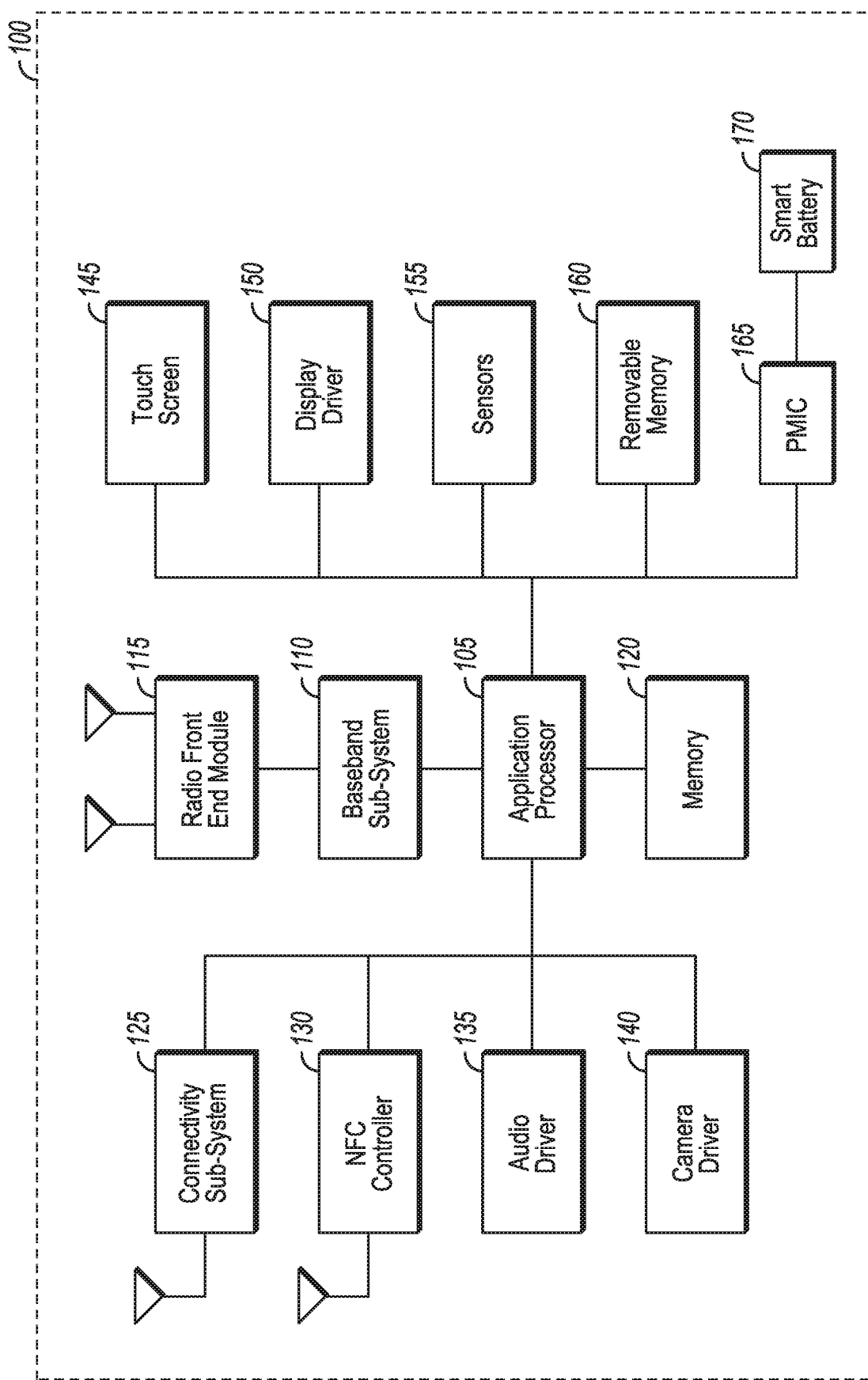
FIG. 1 illustrates a UE in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Any of the radio links described herein may operate according to any one or more of the following exemplary radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MulteFire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, and the like), technologies operating above 300 GHz and THz bands, (3GPP/LTE based or IEEE 802.11p and other), Vehicle-to-Vehicle (V2V), Vehicle-to-X (V2X), Vehicle-to-Infrastructure (V2I), and Infrastructure-to-Vehicle (I2V) communication technologies, 3GPP cellular V2X, DSRC (Dedicated Short Range Communications) communication systems such as Intelligent-Transport-Systems and others.

Aspects described herein can be used in the context of any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz and further frequencies and Spectrum Access System (SAS) in 3.55-3.7 GHz and further frequencies). Applicable exemplary spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, to name a few), IMT-advanced spectrum, IMT-2020 spectrum (expected to include 3600-3800 MHz, 3.5 GHz bands, 700 MHz bands, bands within the 24.25-86 GHz range, for example), spectrum made available under the Federal Communications Commission's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz), WiGig Band 3 (61.56-63.72 GHz), and WiGig Band 4 (63.72-65.88 GHz); the 70.2 GHz-71 GHz band; any band between 65.88 GHz and 71 GHz; bands currently allocated to automotive radar applications such as 76-81 GHz; and future bands including 94-300 GHz and above. Furthermore, the scheme can be used on a secondary basis on bands such as the TV White Space bands (typically below 790 MHz) where in particular the 400 MHz and 700 MHz bands can be employed. Besides cellular applications, specific applications for vertical markets may be addressed, such as PMSE (Program Making and Special Events), medical, health, surgery, automotive, low-latency, drones, and the like.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

FIG. 1 illustrates a UE in accordance with some embodiments. The user device 100 may be a mobile device in some aspects and includes an application processor 105, baseband processor 110 (also referred to as a baseband sub-system), radio front end module (RFEM) 115, memory 120, connectivity sub-system 125, near field communication (NFC) controller 130, audio driver 135, camera driver 140, touch screen 145, display driver 150, sensors 155, removable memory 160, power management integrated circuit (PMIC) 165 and smart battery 170.

In some aspects, application processor 105 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband processor 110 may be implemented, for example, as a solder-down substrate including one or more integrated circuits, a single packaged integrated circuit soldered to a main circuit board, and/or a multi-chip module containing two or more integrated circuits.

Figure 2:
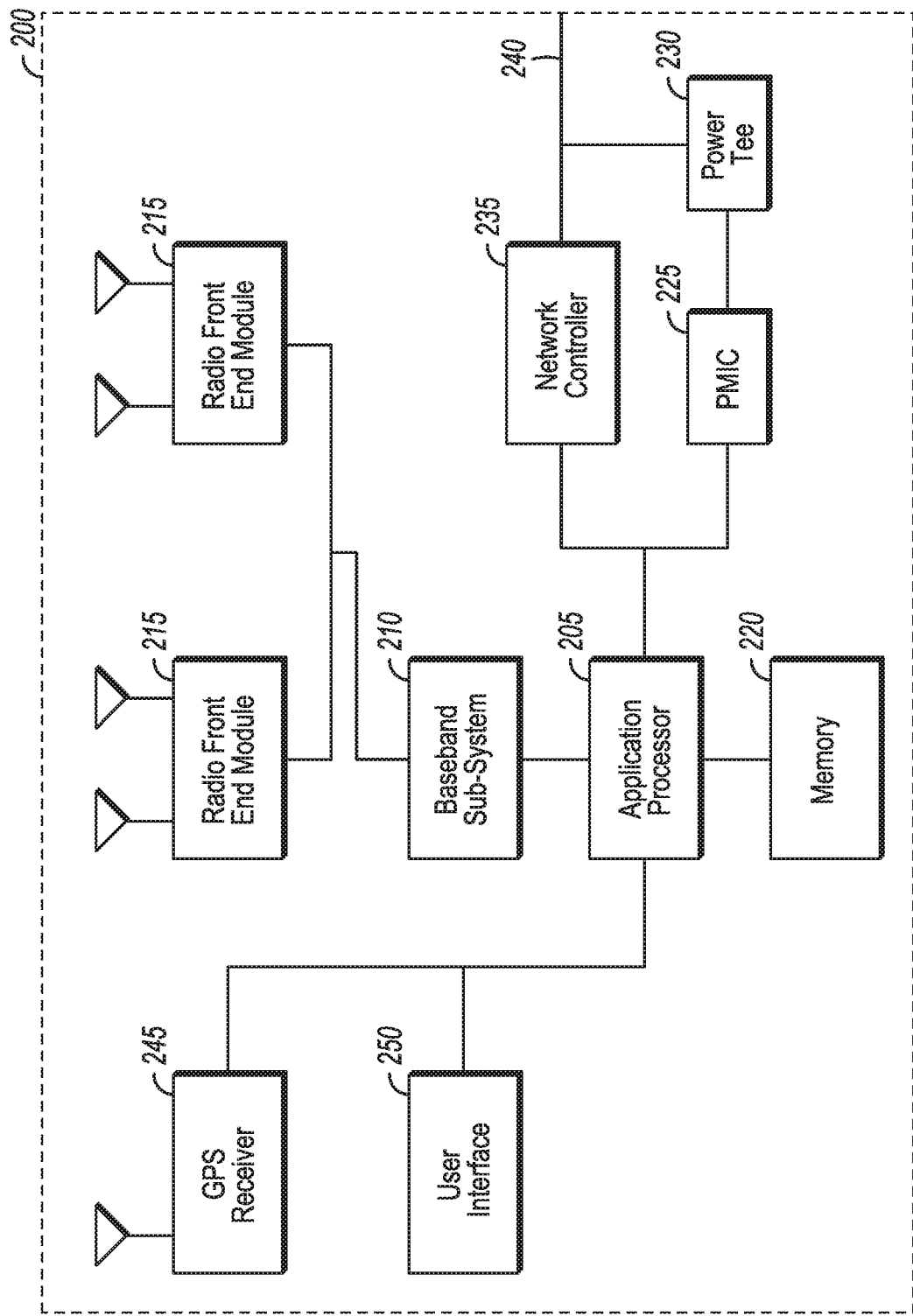
FIG. 2 illustrates a base station or infrastructure equipment radio head in accordance with some embodiments.

FIG. 2 illustrates a base station in accordance with some embodiments. The base station radio head 200 may include one or more of application processor 205, baseband processor 210, one or more radio front end modules 215, memory 220, power management circuitry 225, power tee circuitry 230, network controller 235, network interface connector 240, satellite navigation receiver 245, and user interface 250.

In some aspects, application processor 205 may include one or more CPU cores and one or more of cache memory, low drop-out voltage regulators (LDOs), interrupt controllers, serial interfaces such as SPI, $I^2C$ or universal programmable serial interface, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 210 may be implemented, for example, as a solder-down substrate including one or more integrated circuits, a single packaged integrated circuit soldered to a main circuit board or a multi-chip module containing two or more integrated circuits.

In some aspects, memory 220 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 220 may be implemented as one or more of solder down packaged integrated circuits, socketed memory modules and plug-in memory cards.

In some aspects, power management integrated circuitry 225 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 230 may provide for electrical power drawn from a network cable to provide both power supply and data connectivity to the base station radio head 200 using a single cable.

In some aspects, network controller 235 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver 245 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 245 may provide data to application processor 205 which may include one or more of position data or time data. Application processor 205 may use time data to synchronize operations with other radio base stations.

In some aspects, user interface 250 may include one or more of physical or virtual buttons, such as a reset button, one or more indicators such as light emitting diodes (LEDs) and a display screen.

A radio front end module may incorporate a millimeter wave radio front end module (RFEM) and one or more sub-millimeter wave radio frequency integrated circuits (RFIC). In this aspect, the one or more sub-millimeter wave RFICs may be physically separated from a millimeter wave RFEM. The RFICs may include connection to one or more antennas. The RFEM may be connected to multiple antennas. Alternatively both millimeter wave and sub-millimeter wave radio functions may be implemented in the same physical radio front end module. Thus, the RFEM may incorporate both millimeter wave antennas and sub-millimeter wave antennas.

Figure 3:
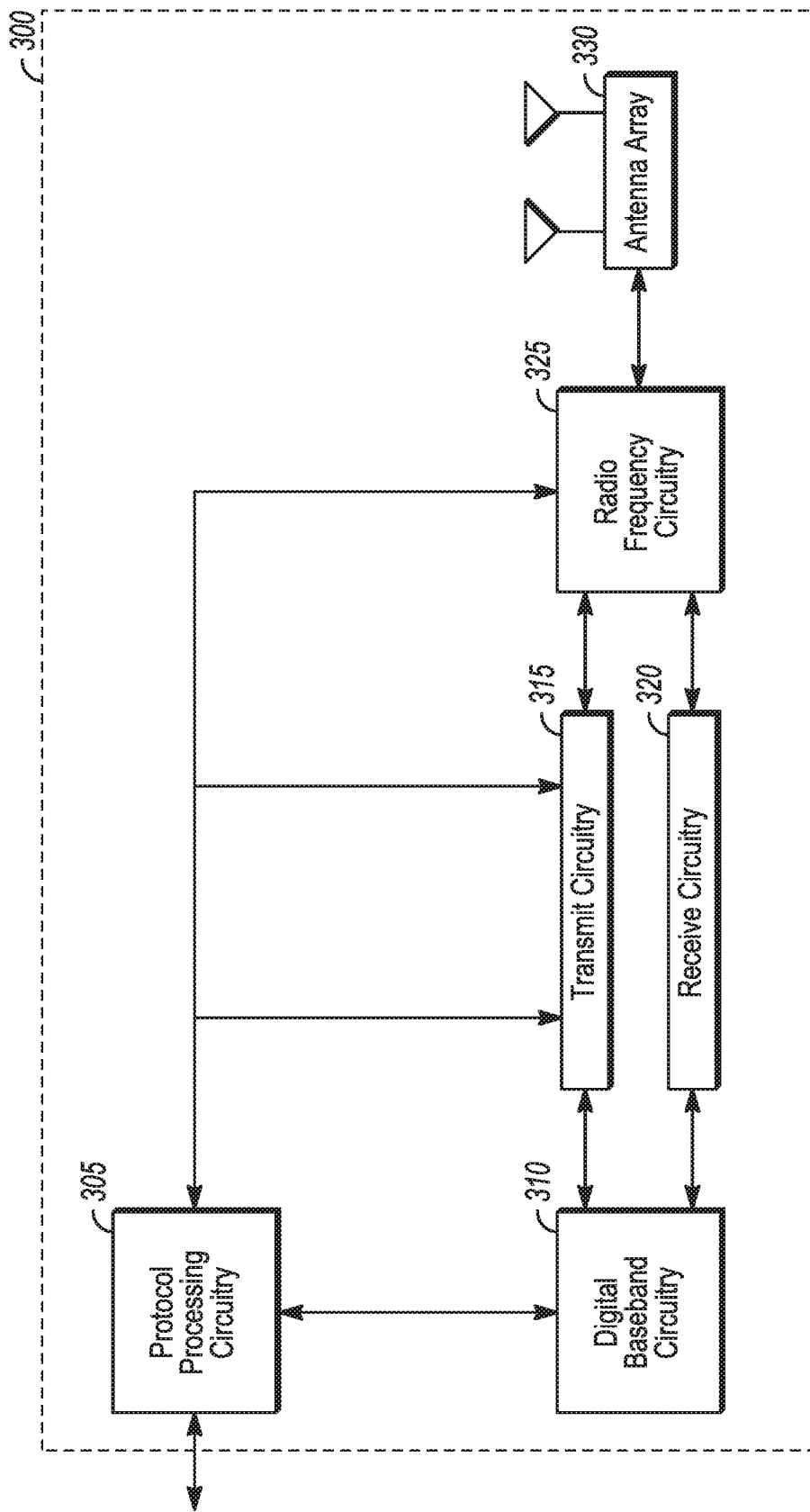
FIG. 3 illustrates millimeter wave communication circuitry in accordance with some embodiments.

FIG. 3 illustrates millimeter wave communication circuitry in accordance with some embodiments. Circuitry 300 is alternatively grouped according to functions. Components as shown in 300 are shown here for illustrative purposes and may include other components not shown here.

Millimeter wave communication circuitry 300 may include protocol processing circuitry 305, which may implement one or more of medium access control (MAC), radio link control (RLC), packet data convergence protocol (PDCP), radio resource control (RRC) and non-access stratum (NAS) functions. Protocol processing circuitry 305 may include one or more processing cores (not shown) to execute instructions and one or more memory structures (not shown) to store program and data information.

Millimeter wave communication circuitry 300 may further include digital baseband circuitry 310, which may implement physical layer (PHY) functions including one or more of hybrid automatic repeat request (HARQ) functions, scrambling and/or descrambling, coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, and other related functions.

Millimeter wave communication circuitry 300 may further include transmit circuitry 315, receive circuitry 320 and/or antenna array circuitry 330.

Millimeter wave communication circuitry 300 may further include radio frequency (RF) circuitry 325. In an aspect, RF circuitry 325 may include multiple parallel RF chains for one or more of transmit or receive functions, each connected to one or more antennas of the antenna array 330.

In an aspect of the disclosure, protocol processing circuitry 305 may include one or more instances of control circuitry (not shown) to provide control functions for one or more of digital baseband circuitry 310, transmit circuitry 315, receive circuitry 320, and/or radio frequency circuitry 325.

The transmit circuitry of may include one or more of digital to analog converters (DACs), analog baseband circuitry, up-conversion circuitry and filtering and amplification circuitry, the latter of which may provide an amount of amplification that is controlled by an automatic gain control (AGC). In another aspect, the transmit circuitry may include digital transmit circuitry and output circuitry.

The radio frequency circuitry may include one or more instances of radio chain circuitry, which in some aspects may include one or more filters, power amplifiers, low noise amplifiers, programmable phase shifters and power supplies. The radio frequency circuitry may include power combining and dividing circuitry in some aspects. In some aspects, the power combining and dividing circuitry may operate bidirectionally, such that the same physical circuitry may be configured to operate as a power divider when the device is transmitting, and as a power combiner when the device is receiving. In some aspects, the power combining and dividing circuitry may one or more include wholly or partially separate circuitries to perform power dividing when the device is transmitting and power combining when the device is receiving. In some aspects, the power combining and dividing circuitry may include passive circuitry comprising one or more two-way power divider/combiners arranged in a tree. In some aspects, the power combining and dividing circuitry may include active circuitry comprising amplifier circuits.

In some aspects, the radio frequency circuitry may connect to transmit circuitry and receive circuitry via one or more radio chain interfaces or a combined radio chain interface. In some aspects, one or more radio chain interfaces may provide one or more interfaces to one or more receive or transmit signals, each associated with a single antenna structure which may comprise one or more antennas.

In some aspects, the combined radio chain interface may provide a single interface to one or more receive or transmit signals, each associated with a group of antenna structures comprising one or more antennas.

The receive circuitry may include one or more of parallel receive circuitry and/or one or more of combined receive circuitry. In some aspects, the one or more parallel receive circuitry and one or more combined receive circuitry may include one or more Intermediate Frequency (IF) down-conversion circuitry, IF processing circuitry, baseband down-conversion circuitry, baseband processing circuitry and analog-to-digital converter (ADC) circuitry.

In an aspect, the RF circuitry may include one or more of each of IF interface circuitry, filtering circuitry, upconversion and downconversion circuitry, synthesizer circuitry, filtering and amplification circuitry, power combining and dividing circuitry and radio chain circuitry.

In an aspect, the baseband processor may contain one or more digital baseband systems. In an aspect, the one or more digital baseband subsystems may be coupled via an interconnect subsystem to one or more of a CPU subsystem, audio subsystem and interface subsystem. In an aspect, the one or more digital baseband subsystems may be coupled via another interconnect subsystem to one or more of each of digital baseband interface and mixed-signal baseband sub-system. In an aspect, the interconnect subsystems may each include one or more of each of buses point-to-point connections and network-on-chip (NOC) structures.

In an aspect, an audio sub-system may include one or more of digital signal processing circuitry, buffer memory, program memory, speech processing accelerator circuitry, data converter circuitry such as analog-to-digital and digital-to-analog converter circuitry, and analog circuitry including one or more of amplifiers and filters. In an aspect, a mixed signal baseband sub-system may include one or more of an IF interface, analog IF subsystem, downconverter and upconverter subsystem, analog baseband subsystem, data converter subsystem, synthesizer and control sub-system.

A baseband processing subsystem may include one or more of each of DSP sub-systems, interconnect sub-system, boot loader sub-system, shared memory sub-system, digital I/O sub-system, digital baseband interface sub-system and audio sub-system. In an example aspect, the baseband processing subsystem may include one or more of each of an accelerator subsystem, buffer memory, interconnect subsystem, audio sub-system, shared memory sub-system, digital I/O subsystem, controller sub-system and digital baseband interface sub-system.

In an aspect, the boot loader sub-system may include digital logic circuitry configured to perform configuration of the program memory and running state associated with each of the one or more DSP sub-systems. The configuration of the program memory of each of the one or more DSP sub-systems may include loading executable program code from storage external to baseband processing sub-system. The configuration of the running state associated with each of the one or more DSP sub-systems may include one or more of the steps of: setting the state of at least one DSP core which may be incorporated into each of the one or more DSP sub-systems to a state in which it is not running, and setting the state of at least one DSP core which may be incorporated into each of the one or more DSP sub-systems into a state in which it begins executing program code starting from a predefined memory location.

In an aspect, the shared memory sub-system may include one or more of a read-only memory (ROM), static random access memory (SRAM), embedded dynamic random access memory (eDRAM) and non-volatile random access memory (NVRAM). In an aspect, the digital I/O subsystem may include one or more of serial interfaces such as I²C, SPI or other 1, 2 or 3-wire serial interfaces, parallel interfaces such as general-purpose input-output (GPIO), register access interfaces and direct memory access (DMA). In an aspect, a register access interface implemented in digital I/O subsystem may permit a microprocessor core external to baseband processing subsystem (1000 cross reference) to read and/or write one or more of control and data registers and memory. In an aspect, DMA logic circuitry implemented in digital I/O subsystem may permit transfer of contiguous blocks of data between memory locations including memory locations internal and external to baseband processing subsystem. In an aspect, the digital baseband interface sub-system may provide for the transfer of digital baseband samples between the baseband processing subsystem and mixed signal baseband or radio-frequency circuitry external to the baseband processing subsystem. In an aspect, the digital baseband samples transferred by the digital baseband interface sub-system may include in-phase and quadrature (I/Q) samples.

In an aspect, the controller sub-system may include one or more of each of control and status registers and control state machines. In an aspect, the control and status registers may be accessed via a register interface and may provide for one or more of: starting and stopping operation of control state machines, resetting control state machines to a default state, configuring optional processing features, configuring the generation of interrupts and reporting the status of operations. In an aspect, each of the one or more control state machines may control the sequence of operation of each of the one or more accelerator sub-systems.

In an aspect, the DSP sub-system may include one or more of each of a DSP core sub-system, local memory, direct memory access sub-system, accelerator sub-system, external interface sub-system, power management unit and interconnect sub-system. In an aspect, the local memory may include one or more of each of read-only memory, static random access memory or embedded dynamic random access memory. In an aspect, the direct memory access sub-system may provide registers and control state machine circuitry adapted to transfer blocks of data between memory locations including memory locations internal and external to the digital signal processor sub-system. In an aspect, the external interface sub-system may provide for access by a microprocessor system external to DSP sub-system to one or more of memory, control registers and status registers which may be implemented in the DSP sub-system. In an aspect, the external interface sub-system may provide for transfer of data between local memory and storage external to the DSP sub-system under the control of one or more of the DMA sub-system and DSP core sub-system.

Figure 4:
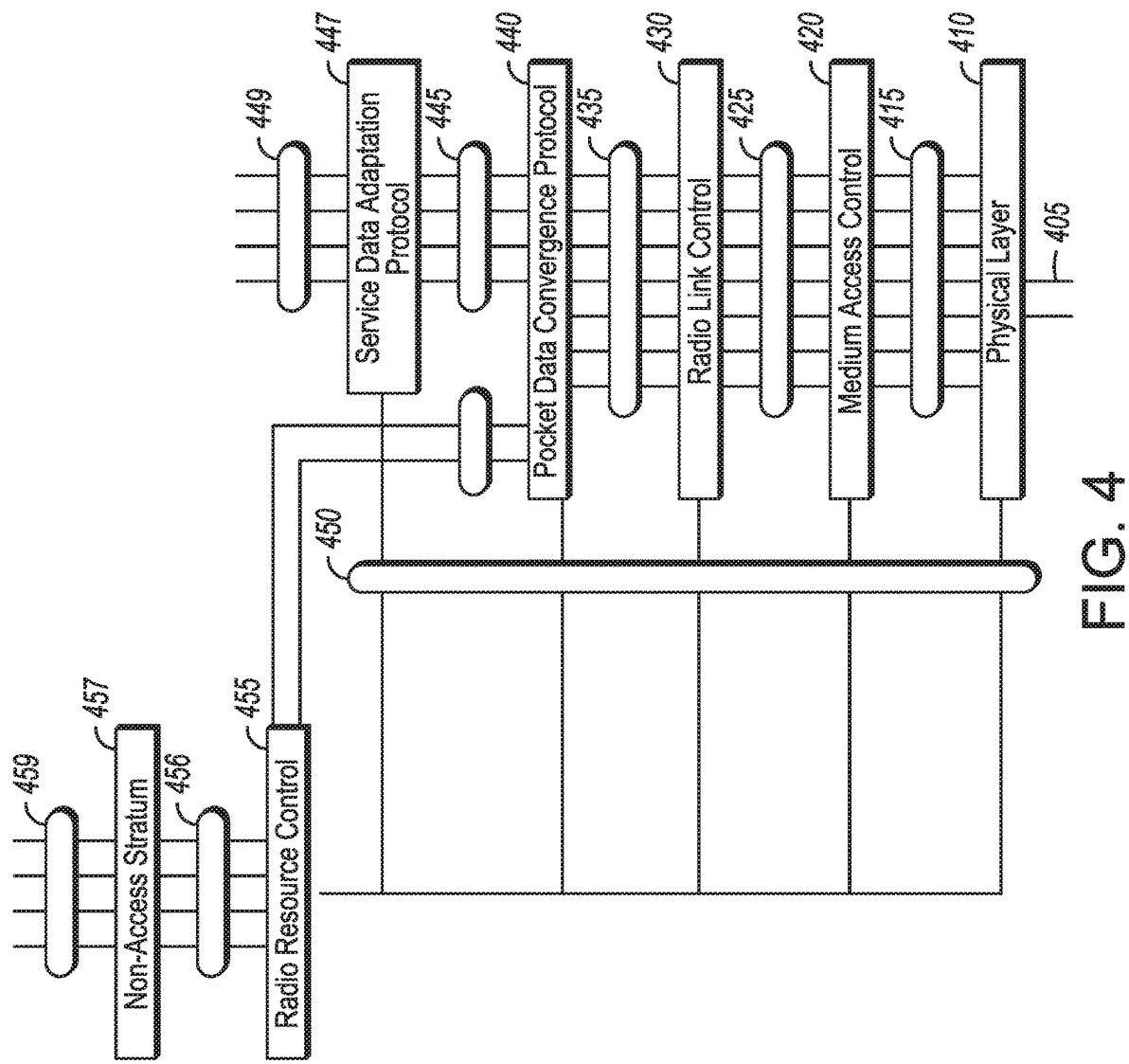
FIG. 4 is an illustration of protocol functions in accordance with some embodiments.

FIG. 4 is an illustration of protocol functions in accordance with some embodiments. The protocol functions may be implemented in a wireless communication device according to some aspects. In some aspects, the protocol layers may include one or more of physical layer (PHY) 410, medium access control layer (MAC) 420, radio link control layer (RLC) 430, packet data convergence protocol layer (PDCP) 440, service data adaptation protocol (SDAP) layer 447, radio resource control layer (RRC) 455, and non-access stratum (NAS) layer 457, in addition to other higher layer functions not illustrated.

According to some aspects, the protocol layers may include one or more service access points that may provide communication between two or more protocol layers. According to some aspects, the PHY 410 may transmit and receive physical layer signals 405 that may be received or transmitted respectively by one or more other communication devices. According to some aspects, physical layer signals 405 may comprise one or more physical channels.

According to some aspects, an instance of PHY 410 may process requests from and provide indications to an instance of MAC 420 via one or more physical layer service access points (PHY-SAP) 415. According to some aspects, requests and indications communicated via PHY-SAP 415 may comprise one or more transport channels.

According to some aspects, an instance of MAC 410 may process requests from and provide indications to an instance of RLC 430 via one or more medium access control service access points (MAC-SAP) 425. According to some aspects, requests and indications communicated via MAC-SAP 425 may comprise one or more logical channels.

According to some aspects, an instance of RLC 430 may process requests from and provide indications to an instance of PDCP 440 via one or more radio link control service access points (RLC-SAP) 435. According to some aspects, requests and indications communicated via RLC-SAP 435 may comprise one or more RLC channels.

According to some aspects, an instance of PDCP 440 may process requests from and provide indications to one or more of an instance of RRC 455 and one or more instances of SDAP 447 via one or more packet data convergence protocol service access points (PDCP-SAP) 445. According to some aspects, requests and indications communicated via PDCP-SAP 445 may comprise one or more radio bearers.

According to some aspects, an instance of SDAP 447 may process requests from and provide indications to one or more higher layer protocol entities via one or more service data adaptation protocol service access points (SDAP-SAP) 449. According to some aspects, requests and indications communicated via SDAP-SAP 449 may comprise one or more quality of service (QoS) flows.

According to some aspects, RRC entity 455 may configure, via one or more management service access points (M-SAP), aspects of one or more protocol layers, which may include one or more instances of PHY 410, MAC 420, RLC 430, PDCP 440 and SDAP 447. According to some aspects, an instance of RRC 455 may process requests from and provide indications to one or more NAS entities via one or more RRC service access points (RRC-SAP) 456.

Figure 5:
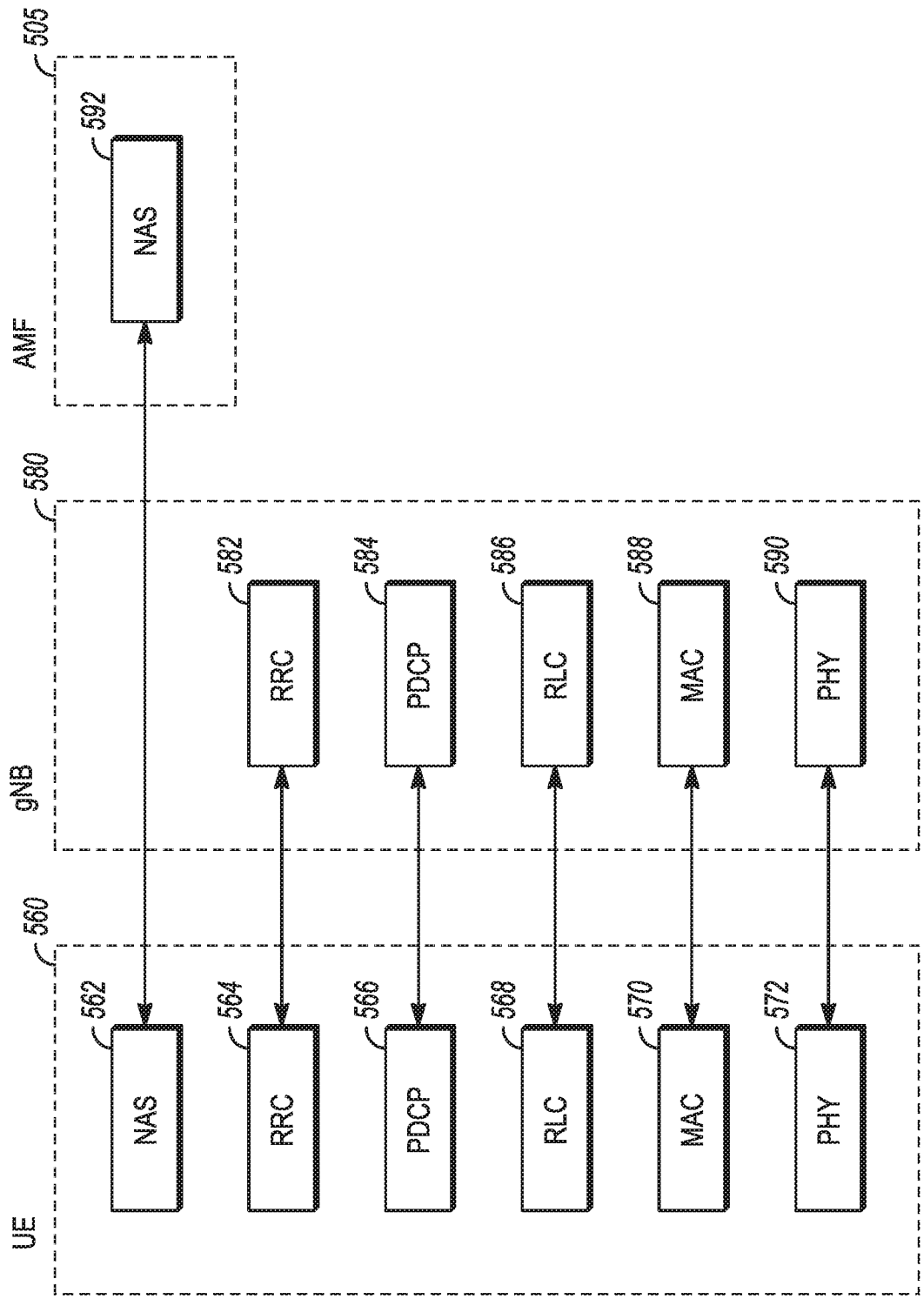
FIG. 5 is an illustration of protocol entities in accordance with some embodiments.

FIG. 5 is an illustration of protocol entities in accordance with some embodiments. The protocol entities may be implemented in wireless communication devices, including one or more of a user equipment (UE) 560, a base station, which may be termed an evolved node B (eNB), or new radio node B (gNB) 580, and a network function, which may be termed a mobility management entity (MME), or an access and mobility management function (AMF) 594, according to some aspects.

According to some aspects, gNB 580 may be implemented as one or more of a dedicated physical device such as a macro-cell, a femto-cell or other suitable device, or in an alternative aspect, may be implemented as one or more software entities running on server computers as part of a virtual network termed a cloud radio access network (CRAN).

According to some aspects, one or more protocol entities that may be implemented in one or more of UE 560, gNB 580 and AMF 594, may be described as implementing all or part of a protocol stack in which the layers are considered to be ordered from lowest to highest in the order PHY, MAC, RLC, PDCP, RRC and NAS. According to some aspects, one or more protocol entities that may be implemented in one or more of UE 560, gNB 580 and AMF 594, may communicate with a respective peer protocol entity that may be implemented on another device, using the services of respective lower layer protocol entities to perform such communication.

According to some aspects, UE PHY 572 and peer entity gNB PHY 590 may communicate using signals transmitted and received via a wireless medium. According to some aspects, UE MAC 570 and peer entity gNB MAC 588 may communicate using the services provided respectively by UE PHY 572 and gNB PHY 590. According to some aspects, UE RLC 568 and peer entity gNB RLC 586 may communicate using the services provided respectively by UE MAC 570 and gNB MAC 588. According to some aspects, UE PDCP 566 and peer entity gNB PDCP 584 may communicate using the services provided respectively by UE RLC 568 and 5GNB RLC 586. According to some aspects, UE RRC 564 and gNB RRC 582 may communicate using the services provided respectively by UE PDCP 566 and gNB PDCP 584. According to some aspects, UE NAS 562 and AMF NAS 592 may communicate using the services provided respectively by UE RRC 564 and gNB RRC 582.

The UE and gNB may communicate using a radio frame structure that has a predetermined duration and repeats in a periodic manner with a repetition interval equal to the predetermined duration. The radio frame may be divided into two or more subframes. In an aspect, subframes may be of predetermined duration which may be unequal. In an alternative aspect, subframes may be of a duration which is determined dynamically and varies between subsequent repetitions of the radio frame. In an aspect of frequency division duplexing (FDD), the downlink radio frame structure is transmitted by a base station to one or devices, and uplink radio frame structure transmitted by a combination of one or more devices to a base station. The radio frame may have a duration of 10 ms. The radio frame may be divided into slots each of duration 0.5 ms, and numbered from 0 to 19. Additionally, each pair of adjacent slots numbered 2i and 2i+1, where i is an integer, may be referred to as a subframe. Each subframe may include a combination of one or more of downlink control information, downlink data information, uplink control information and uplink data information. The combination of information types and direction may be selected independently for each subframe.

According to some aspects, the downlink frame and uplink frame may have a duration of 10 ms, and uplink frame may be transmitted with a timing advance with respect to downlink frame. According to some aspects, the downlink frame and uplink frame may each be divided into two or more subframes, which may be 1 ms in duration. According to some aspects, each subframe may consist of one or more slots. In some aspects, the time intervals may be represented in units of $T_s$. According to some aspects, T may be defined as $1/(30{,}720 \times 1000)$ seconds. According to some aspects, a radio frame may be defined as having duration $30{,}720 \cdot T_s$, and a slot may be defined as having duration $15.360\, T_s$. According to some aspects, $T_s$ may be defined as $$T_s = 1/(\Delta f_{max} \cdot N_f),$$

where $\Delta f_{max} = 480 \times 10^3$ and $Nf = 4{,}096$. According to some aspects E, the number of slots may be determined based on a numerology parameter, which may be related to a frequency spacing between subcarriers of a multicarrier signal used for transmission.

Constellation designs of a single carrier modulation scheme that may be transmitted or received may contain 2 points, known as binary phase shift keying (BPSK), 4 points, known as quadrature phase shift keying (QPSK), 16 points, known as quadrature amplitude modulation (QAM) with 16 points (16QAM or QAM16) or higher order modulation constellations, containing for example 64, 256 or 1024 points. In the constellations, the binary codes are assigned to the points of the constellation using a scheme such that nearest-neighbor points, that is, pairs of points separated from each other by the minimum Euclidian distance, have an assigned binary code differing by only one binary digit. For example, the point assigned code 1000 has nearest neighbor points assigned codes 1001, 0000, 1100 and 1010, each of which differs from 1000 by only one bit.

Alternatively, the constellation points may be arranged in a square grid, and may be arranged such that there is an equal distance on the in-phase and quadrature plane between each pair of nearest-neighbor constellation points. In an aspect, the constellation points may be chosen such that there is a pre-determined maximum distance from the origin of the in-phase and quadrature plane of any of the allowed constellation points, the maximum distance represented by a circle. In an aspect, the set of allowed constellation points may exclude those that would fall within square regions at the corners of a square grid. The constellation points are shown on orthogonal in-phase and quadrature axes, representing, respectively, amplitudes of sinusoids at the carrier frequency and separated in phase from one another by 90 degrees. In an aspect, the constellation points are grouped into two or more sets of constellation points, the points of each set being arranged to have an equal distance to the origin of the in-phase and quadrature plane, and lying on one of a set of circles centered on the origin.

To generate multicarrier baseband signals for transmission, data may be input to an encoder to generate encoded data. The encoder may include a combination of one or more of error detecting, error correcting, rate matching, and interleaving. The encoder may further include a step of scrambling. In an aspect, encoded data may be input to a modulation mapper to generate complex valued modulation symbols. The modulation mapper may map groups containing one or more binary digits, selected from the encoded data, to complex valued modulation symbols according to one or more mapping tables. In an aspect, complex-valued modulation symbols may be input to the layer mapper to be mapped to one or more layer mapped modulation symbol streams.

Representing a stream of modulation symbols 440 as d(i) where i represents a sequence number index, and the one or more streams of layer mapped symbols as $x^{(k)}(i)$ where k represents a stream number index and i represents a sequence number index, the layer mapping function for a single layer may be expressed as:

$$x^{(0)}(i)=d(i)$$

and the layer mapping for two layers may be expressed as:

$$x^{(0)}(i)=d(2i)$$

$$x^{(1)}(i)=d(2i+1)$$

Layer mapping may be similarly represented for more than two layers.

In an aspect, one or more streams of layer mapped symbols may be input to the precoder which generates one or more streams of precoded symbols. Representing the one or more streams of layer mapped symbols as a block of vectors:

$$[x^{(0)}(i) \ldots x^{(v-1)}(i)]^T$$

where i represents a sequence number index in the range 0 to $M_{symb}^{layer}-1$ the output is represented as a block of vectors:

$$[z^{(0)}(i) \ldots z^{(P-i)}(i)]^T$$

where i represents a sequence number index in the range 0 to $M_{symb}^{ap}-1$. The precoding operation may be configured to include one of direct mapping using a single antenna port, transmit diversity using space-time block coding, or spatial multiplexing.

In an aspect, each stream of precoded symbols may be input to a resource mapper which generates a stream of resource mapped symbols. The resource mapper may map precoded symbols to frequency domain subcarriers and time domain symbols according to a mapping which may include contiguous block mapping, randomized mapping or sparse mapping according to a mapping code.

In an aspect, the resource mapped symbols may be input to multicarrier generator which generates a time domain baseband symbol. Multicarrier generator may generate time domain symbols using, for example, an inverse discrete Fourier transform (DFT), commonly implemented as an inverse fast Fourier transform (FFT) or a filter bank comprising one or more filters. In an aspect, where resource mapped symbols 455 are represented as $s_k(i)$, where k is a subcarrier index and i is a symbol number index, a time domain complex baseband symbol x(t) may be represented as:

$$x(t) = \sum_k s_k(i)p_T(t - T_{sym})\exp[j2\pi f_k(t - T_{sym} - \tau_k)]$$

Where $p_T(t)$ is a prototype filter function, $T_{symb}$ is the start time of the symbol period, a is a subcarrier dependent time offset, and $f_k$ is the frequency of subcarrier k. Prototype functions $p_T(t)$ may be, for example, rectangular time domain pulses, Gaussian time domain pulses or any other suitable function.

In some aspects, a sub-component of a transmitted signal consisting of one subcarrier in the frequency domain and one symbol interval in the time domain may be termed a resource element. Resource elements may be depicted in a grid form. In some aspects, resource elements may be grouped into rectangular resource blocks consisting of 12 subcarriers in the frequency domain and the P symbols in the time domain, where P may correspond to the number of symbols contained in one slot, and may be 6, 7, or any other suitable number of symbols. In some alternative aspects, resource elements may be grouped into resource blocks consisting of 12 subcarriers in the frequency domain and one symbol in the time domain. Each resource element 05 may be indexed as (k,l) where k is the index number of subcarrier, in the range 0 to N·M−1, where N is the number of subcarriers in a resource block, and M is the number of resource blocks spanning a component carrier in the frequency domain.

In some aspects, coding of the signal to be transmitted may include one or more physical coding processes that may be used to provide coding for a physical channel that may encode data or control information. Coding may also include multiplexing and interleaving that generates combined coded information by combining information from one or more sources, which may include one of more of data information and control information, and which may have been encoded by one or more physical coding processes. The combined coded information may be input to a scrambler which may generate scrambled coded information. Physical coding process may include one or more of CRC attachment, code block segmentation, channel coding, rate matching and code block concatenation. An encoder that may be used to encode data according to one of a convolutional code and a tail-biting convolutional code.

A MAC entity that may be used to implement medium access control layer functions may include one or more of a controller, a logical channel prioritizing unit, a channel multiplexer & de-multiplexer, a PDU filter unit, random access protocol entity, data hybrid automatic repeat request protocol (HARQ) entity and broadcast HARQ entity.

According to some aspects, a higher layer may exchange control and status messages with controller via management service access point. According to some aspects, MAC service data units (SDU) corresponding to one or more logical channels may be exchanged with the MAC entity via one or more service access points (SAP). According to some aspects, a PHY SDU corresponding to one or more transport channels may be exchanged with a physical layer entity via one or more SAPs. According to some aspects, the logical channel prioritization unit may perform prioritization amongst one or more logical channels, which may include storing parameters and state information corresponding to each of the one or more logical channels, that may be initialized when a logical channel is established. According to some aspects, the logical channel prioritization unit may be configured with a set of parameters for each of one or more logical channels, each set including parameters which may include one or more of a prioritized bit rate (PBR) and a bucket size duration (BSD).

According to some aspects, the multiplexer & de-multiplexer may generate MAC PDUs, which may include one or more of MAC-SDUs or partial MAC-SDUs corresponding to one or more logical channels, a MAC header which may include one or more MAC sub-headers, one or more MAC control elements, and padding data. According to some aspects, the multiplexer & de-multiplexer may separate one or more MAC-SDUs or partial MAC-SDUs contained in a received MAC PDU, corresponding to one or more logical channels, and may indicate the one or more MAC-SDUs or partial MAC-SDUs to a higher layer via one or more service access points. According to some aspects, the HARQ entity and broadcast HARQ entity may include one or more parallel HARQ processes, each of which may be associated with a HARQ identifier, and which may be one of a receive or transmit HARQ process.

According to some aspects, a transmit HARQ process may generate a transport block (TB) to be encoded by the PHY according to a specified redundancy version (RV), by selecting a MAC-PDU for transmission. According to some aspects, a transmit HARQ process that is included in a broadcast HARQ entity may retransmit a same TB in successive transmit intervals a predetermined number of times. According to some aspects, a transmit HARQ process included in a HARQ entity may determine whether to retransmit a previously transmitted TB or to transmit a new TB at a transmit time based on whether a positive acknowledgement or a negative acknowledgement was received for a previous transmission.

According to some aspects, a receive HARQ process may be provided with encoded data corresponding to one or more received TBs and which may be associated with one or more of a new data indication (NDI) and a redundancy version (RV), and the receive HARQ process may determine whether each such received encoded data block corresponds to a retransmission of a previously received TB or a not previously received TB. According to some aspects, a receive HARQ process may include a buffer, which may be implemented as a memory or other suitable storage device, and may be used to store data based on previously received data for a TB. According to some aspects, a receive HARQ process may attempt to decode a TB, the decoding based on received data for the TB, and which may be additionally based on the stored data based on previously received data for the TB.

Figure 6:
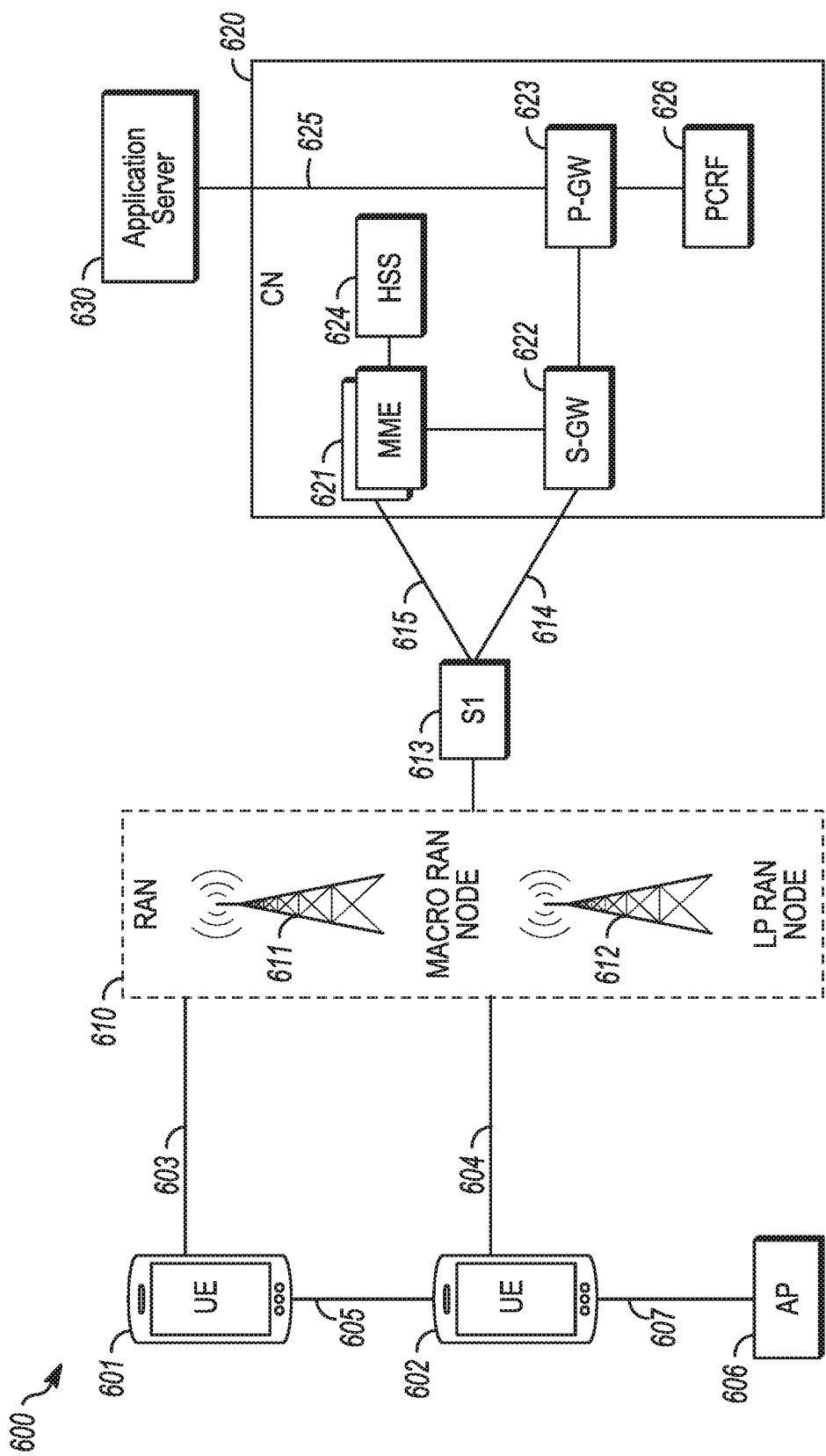
FIG. 6 illustrates an architecture of a system of a network in accordance with some embodiments.

FIG. 6 illustrates an architecture of a system of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or MTC for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610—the RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi) router. In this example, the AP 606 is shown to be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNBs), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 610 is shown to be communicatively coupled to a core network (CN) 620—via an S1 or NG interface 613. In embodiments, the CN 620 may be an evolved packet core (EPC) network, a 5GC network, or some other type of CN. In this embodiment, the S1 interface 613 is split into two parts: the S1-U interface 614, which carries traffic data between the RAN nodes 611 and 612 and the serving gateway (S-GW) 622, and the S1-mobility management entity (MME) interface 615, which is a signaling interface between the RAN nodes 611 and 612 and MMEs 621.

In this embodiment, the CN 620 comprises the MMEs 621, the S-GW 622, the Packet Data Network (PDN) Gateway (P-GW) 623, and a home subscriber server (HSS) 624.

The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the EPC network 623 and external networks such as a network including the application server 630 (alternatively referred to as application function (AF)) via an Internet Protocol (IP) interface 625. Generally, the application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. Policy and Charging Rules Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

The components of FIG. 6 are able to read instructions from a machine-readable or computer-readable medium (e.g., a non-transitory machine-readable storage medium) and perform any one or more of the methodologies discussed herein. In particular, the processors (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may read and follow the instructions on a non-transitory medium.

Instructions may comprise software, a program, an application, an applet, an app, or other executable code for causing at least any of the processors to perform any one or more of the methodologies discussed herein. The instructions may reside, completely or partially, within at least one of the processors (e.g., within the processor's cache memory), the memory/storage devices, or any suitable combination thereof. In some embodiments, the instructions may reside on a tangible, non-volatile communication device readable medium, which may include a single medium or multiple media. Furthermore, any portion of the instructions may be transferred to the hardware resources from any combination of the peripheral devices or the databases 606. Accordingly, the memory of processors, the memory/storage devices, the peripheral devices, and the databases are examples of computer-readable and machine-readable media.

Figure 7:
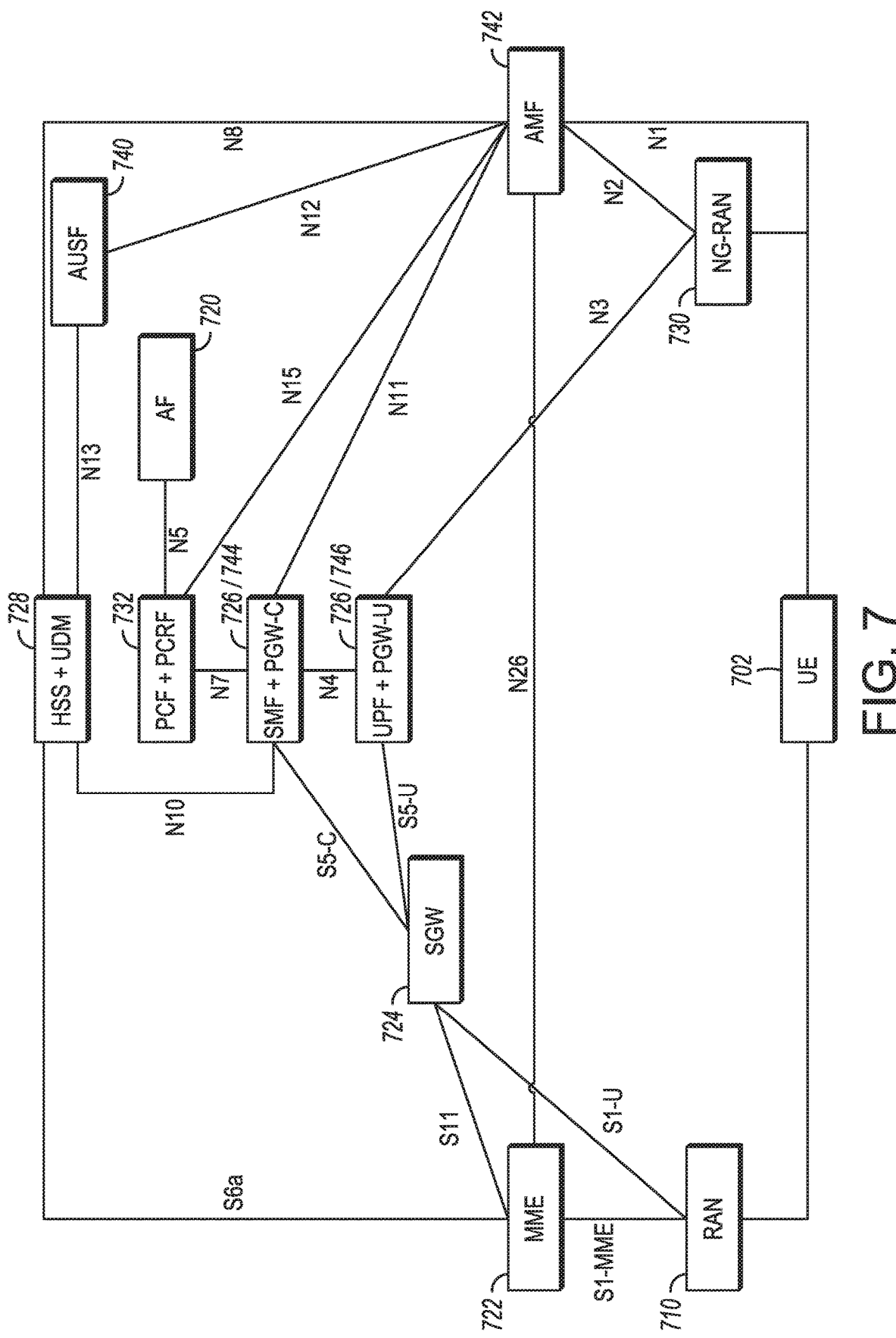
FIG. 7 illustrates a combined 4G and 5G communication system in accordance with some embodiments.

The above discussion concentrates primarily on LTE networks, however, 5G networks will soon start to be deployed, leading to various challenges. FIG. 7 illustrates a combined 4G and 5G communication system in accordance with some embodiments. Some elements may not be shown for convenience. The 4G core network (EPC) contains, as above, protocol and reference points are defined for each entity such as the MME, SGW, and PGW. The 5G (next generation) architecture as includes multiple network functions (NFs) and reference points connecting the network functions. A network function can be implemented as a discrete network element on a dedicated hardware, as a software instance running on dedicated hardware, or as a virtualized function instantiated on an appropriate platform, e.g., dedicated hardware or a cloud infrastructure.

In FIG. 7, the UE 702 may be connected to a random access network (RAN) 710 of an Evolved Packet Core (EPC) and/or a NG-RAN (gNB) 730 of a 5G CN. The RAN 710 may be an eNB or a general non-3GPP access point, such as that for Wi-Fi. The gNB 730 may be a standalone gNB or a non-standalone gNB, e.g., operating in Dual Connectivity (DC) mode as a booster controlled by the eNB 710 through an X2 interface. The gNB 730 may, for example, provide additional capacity within a predetermined area inside the area of the eNB 710. The eNB 710 may be connected with an MME 722 of the EPC through an S1-MME interface and with a SGW 724 of the EPC through an S1-U interface. The MME 722 may be connected with an HSS 728 through an S6a interface.

In the 5G network, the control plane and the user plane may be separated, which may permit independent scaling and distribution of the resources of each plane. The UE 702 may be connected to an Access and Mobility Function (AMF) 742 of the 5G CN. The 5G CN may contain multiple network functions besides the AMF 712. These functions may include a User Plane Function (UPF) 746, a Session Management Function (SMF) 744, a Policy Control Function (PCF) 732, an Application Function (AF) 720, an Authentication Server Function (AUSF) 740 and User Data Management (UDM) 728. The various elements may be connected by the reference points shown in FIG. 7. At least some of functionality of the EPC and the 5G CN may be shared. Alternatively, separate components may be used for each of the combined component shown.

The AMF 712 may provide mobility-related functionality similar to that of the MME 722. This functionality may include UE-based authentication, authorization and mobility management, for example. The AMF 712 may be independent of the access technologies. The SMF 714 and UPF 706 may split the 5G control and user functionality of the PGW 726. The SMF 714 may be responsible for session management and allocation of IP addresses to the UE 702. The SMF 714 may also select and control the UPF 706 for data transfer, including the establishment of filters in the UPF 706.

The SMF 714 may be associated with a single session of the UE 702 or multiple sessions of the UE 702. This is to say that the UE 702 may have multiple 5G sessions. In some embodiments, different SMFs may be allocated to each session. The use of different SMFs may permit each session to be individually managed. As a consequence, the functionalities of each session may be independent of each other. The UPF 746 may be connected with a data network, with which the UE 702 may communicate, the UE 702 transmitting uplink data to or receiving downlink data from the data network.

The AF 720 may provide information on the packet flow to the PCF 732 responsible for policy control to support a desired QoS. The AF 720 may send service requests and CODEC (Coding-Decoding, or Compression-Decompression) parameters to a Policy and Charging Rules function (PCRF) 732. The PCF 732 may set mobility and session management policies for the UE 702. To this end, the PCF 732 may use the packet flow information to determine the appropriate policies for proper operation of the AMF 742 and SMF 744. The AUSF 740 may store data for UE authentication.

The UDM 728 (which may be shared with the HSS) may similarly store the UE subscription data. The UDM 728 may be connected to the AMF 742 through the N8 interface. The SGW 724 may connected with the PGW 726 through an S5 interface (control plane PGW-C through S5-C and user plane PGW-U through S5-U). The PGW 726 may serve as an IP anchor for data through the internet.

The eNB 710 and gNB 730 may communicate data with the SGW 724 of the EPC and the UPF 746 of the 5G CN. The MME 722 and the AMF 742 may be connected via the N26 interface to provide control information therebetween, if the N26 interface is supported by the EPC. The PCF and PCRF 732 may be combined and connected to the AMF 742 through the N15 interface.

The functionality of UE-initiated modification of a packet data network (PDN) connection or protocol data unit (PDU), however, may become problematic in a 5G system for several reasons. For example, when the UE requests a QoS modification, the QoS parameters indicated by the UE are not defined. One such QoS modification may occur when the UE requests a specific QoS for a service data flow (SDF) that is to be created.

In a downlink (DL) transmission, session packets may be received from an application server. The packets may be classified by e.g. determining in which prioritization buffer to place the packets (i.e., to which SDF flow the packets belong) and mapping to QoS flows. The classification may be used to select which authorized QoS parameters to apply to each PDU. The packets, whose specifics may be provided in a SDF header (e.g., marked with the QoS flow), may be transmitted toward the UE. The UPF may receive the packets, prioritize the packets and then send the packets to the UE based on the Guaranteed Bit Rate (GBR). In a UL transmission, the UE may classify the session packets, map the packets to QoS flows, and transmit the packets to the CN as indicated by the QoS flow and priority. The UPF may perform similar functionality as above, transmitting the packets to the application server as indicated by the QoS flow. Note that Traffic Flow Template (TFT) filters may be used in the UE to classify SDFs for UL transmissions and in the PGW/UPF for DL transmissions. Alternatively, packet inspection may be used to classify the packets.

The UE may also determine multiple QoS-related parameters per SDF. The QoS parameters may include the TFT filters and SDF priority. The SDF priority may indicate the admission and resource management priority of the SDF. In addition, the QoS parameters may include the maximum bit rate and GBR, QCI or other delivery characteristics, and network behavior. The network behavior includes the manner in which the network is to treat traffic of the SDF if the QoS represented is not met by the network.

Figure 8:
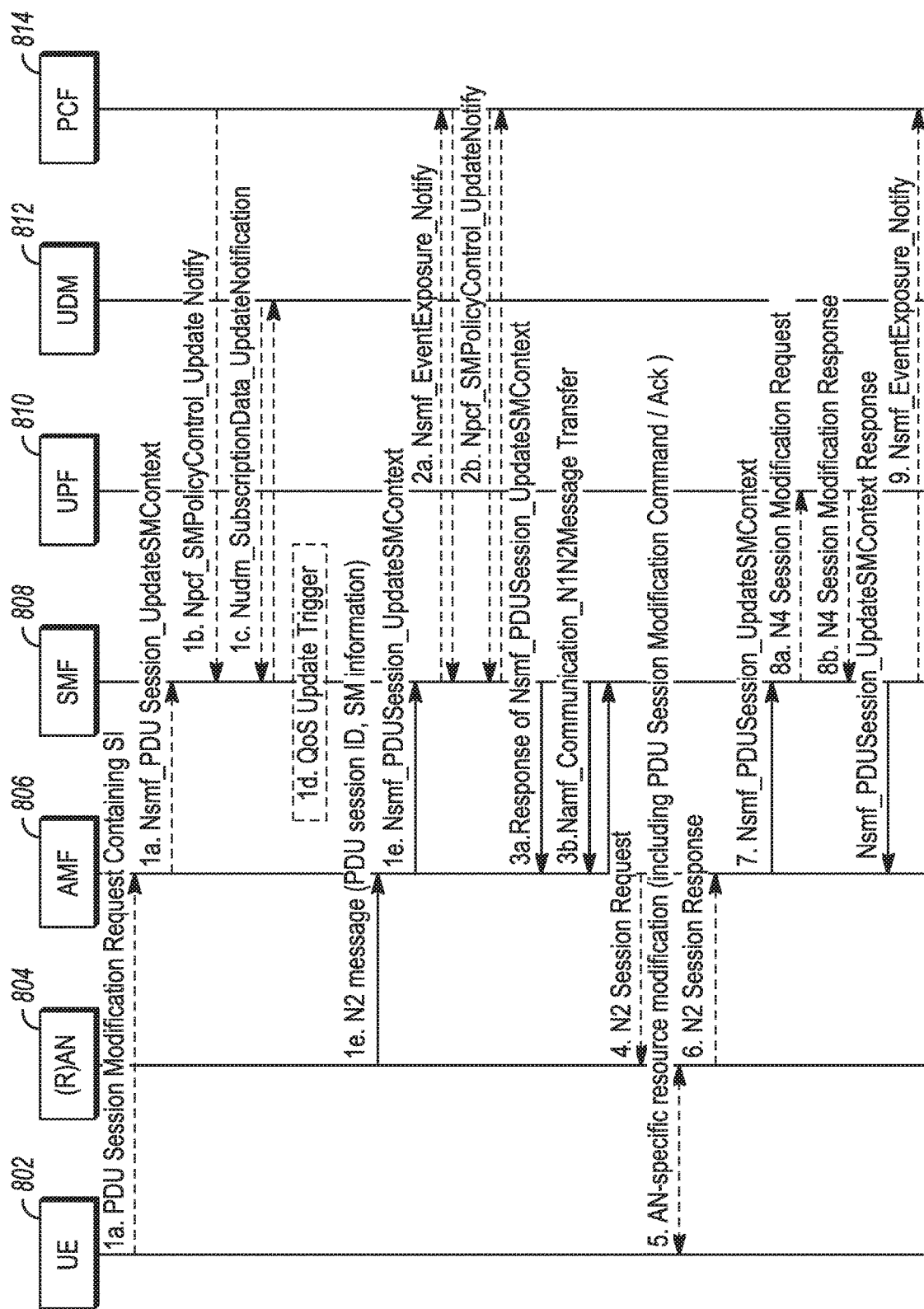
FIG. 8 illustrates a PDU session modification procedure in accordance with some embodiments.

In addition, 5G devices may have a discrete cellular (4G) modem and Application Processor (AP) to process uplink and downlink user data. The majority of the downlink user data may be destined for applications running on the AP, with only minority of the overall downlink traffic destined to applications running on the cellular modem. The latter category may include applications used to gather information periodically reported to a server in the network, which may generate fairly low-bandwidth traffic flows. It would be beneficial for the modem to be able to segregate the low-volume data packets from the traffic destined for the AP prior to decryption of the packets, decrypt the low-volume packets and forward the low-volume packets to the applications running on the modem. The remaining traffic can be forwarded from the modem towards the AP and may use different resources for decryption and other processing, which are more suited for the high-bandwidth nature of this traffic. However, routing of packets to the modem or AP component may employ packet header analysis, which is CPU intensive, especially for the data rate considered for 5G applications. Thus, the 5G device may experience performance degradation if unable to segregate downlink traffic prior to decryption. To avoid this issue, a flow classification indicator may be provided in the SDAP header of a received packet to avoid packet inspection, thereby allowing a more efficient device implementation FIG. 8 illustrates a PDU session modification procedure in accordance with some embodiments. FIG. 8 may illustrate a procedure used during non-roaming and roaming operation with local breakout. The procedure may be triggered by different events, including UE-initiated modification (1a), SMF-requested modification (1b, 1c, 1d) and AN-initiated modification (1e). The process described herein, as above, focuses on the UE-initiated modification procedure, in which communications with the UDM 812 may be avoided. The procedure allows the UE to request specific QoS handling for an SDF with a specific QoS demand or for modification of the packet filters used for an active SDF without changing the QoS.

The procedure in FIG. 8 may typically be used by the UE when the UE already has an active PDU session. In some cases, during UE-requested PDU session modification, the (R)AN 804 may automatically establish the RAN resources for the related modified PDU session if the resources do not exist. This may avoid a situation, for example, where the UE requests a PDU Session Modification for a PDU session for which currently no RAN resources have been established, the network acknowledges the modification request via NAS signalling, but does not establish RAN resources. The UE may then initiate a Service Request procedure to request the establishment of the RAN resources for the respective PDU session. This issue may cause additional signalling and delay before the UE can start sending UL data. Thus, in some embodiments, the (R)AN may establish RAN resources before acknowledging the PDU Session Modification request via NAS signaling.

In this procedure shown in FIG. 8, the UE 802 may, after determining that the PDU session is to be modified (in this case by adding an SDF having a QoS determined by the UE), initiate the PDU Session Modification (SM) procedure. The UE 802 may transmit a Non-Access Stratum (NAS) message. The UE 802 may initiate a Service Request procedure, prior to transmitting the NAS message, if in the CM-IDLE state. The NAS message may be transmitted to the AMF 806 in the 5G network. As the NAS message is transmitted to the 5G network, the NAS message may include a N1 SM container. The N1 SM container may include the PDU Session Modification Request and a PDU Session ID. The NAS message may be forwarded by the (R)AN 804 to the AMF 806 with an indication of User location Information.

The PDU Session Modification Request may include Packet Filters describing the SDF(s), the requested Packet Filter Operation on the indicated Packet Filters, the Requested QoS and a Segregation Indication (SI) when the UE 802 requests a specific QoS for the SDF(s). The Packet Filter Operation may include adding a new packet filter, modifying an existing packet filter or deleting an existing packet filter. The Segregation Indication may be included when the UE recommends to the network to bind the SDF(s) on a distinct and dedicated QoS Flow. The UE 802 requests the new QoS flow even if an existing QoS Flow can support the requested QoS. The network may abide by the UE request, but is allowed to proceed instead with binding the selected SDF(s) on an existing QoS Flow.

The UE 802 may thus make a QoS request for addition, modification or deletion of one or more SDF(s) by providing a description of the SDF(s) in the form of packet filter(s) and providing a requested QoS in terms of 5QI and GBR. The UE 802 may indicate to the network whether the SDF(s) are to be handled on a distinct QoS Flow, even if there is an existing QoS Flow that can support the same QoS handling. The UE 802 may indicate to the network whether the SDF(s) are to be added on an existing QoS Flow identified by the QFI.

The AMF 806, having received the NAS message, may invoke the Nsmf_PDUSession_UpdateSMContext service operation, transmitting to the SMF 808 an Nsmf_PDUSession_UpdateSMContext associated with the PDU session. The Nsmf_PDUSession_UpdateSMContext may allow the AMF 802 to update the AMF-SMF association to provide the SMF 806 with N1/N2 SM information received from the UE 802 or from the (R)AN 804. The N1 SM container containing the PDU Session Modification Request and the PDU Session ID may thus be sent to the SMF 808.

The SMF 808 may report a subscribed event to the PCF 814 by invoking the Nsmf_EventExposure_Notify service operation. The PCF 814 may provide new policy information to the SMF 808 by invoking Npcf_SMPolicyControl_UpdateNotify service operation, in which SMF updated Policy information is provided for the PDU Session evaluated based on information previously provided by the SMF 886, among others.

Operations 3 to 7 are not invoked when the PDU Session modification requires only action, such as gating, at the UPF 810. At operation 3a, the SMF 808 may respond to the AMF 806 through the Nsmf_PDUSession_UpdateSMContext service operation. The information may include N2 SM information and the N1 SM container. The N2 SM information may include the PDU Session ID, QoS Profile, and Session- AMBR. The N2 SM information may carry information that the AMF 806 provides to the (R)AN 804. The N2 SM information may include the QoS profiles that were added, removed or modified, and thus whether the separate QoS flow requested by the UE 802 was added for the SDF(s) or whether the SDF(s) are bound to an existing QoS flow. In some embodiments, if the PDU Session modification was requested by the UE 802 for a PDU Session that has no established user plane resources, the N2 SM information provided to the (R)AN 804 may include information for establishment of user plane resources.

The N1 SM container may carry the PDU Session Modification Command that the AMF 805 may provide to the UE 802. The N1 SM container may include a PDU Session Modification Command, which includes the PDU Session ID, QoS rule, and Session-AMBR. As above, the QoS profile for the QoS Flow may include as QoS parameters a 5G QoS Identifier (5QI) and an Allocation and Retention Priority (ARP). For a non-GBR QoS flow, the QoS profile may also include a Reflective QoS Attribute (RQA). For a GBR QoS flow, the QoS profile may also include UL and DL Guaranteed Flow Bit Rate (GFBR) and Maximum Flow Bit Rate (MFBR), as well as Maximum UL and DL Packet Loss Rate and Notification control. The QoS rule may be used by the UE to perform classification and marking of UL User plane traffic, i.e. the association of UL traffic to QoS Flows, based on QoS rules.

The AMF 806, in response to receiving the response to the Nsmf_PDUSession_UpdateSMContext from the SMF 808, at operation 4 may send a N2 PDU Session Request Message to the (R)AN 804. The N2 PDU Session Request Message may include the N2 SM information received from SMF 808 and the NAS message, which includes the PDU Session ID and N1 SM container. The N1 SM container may include the PDU Session Modification Command.

The (R)AN 804 may at operation 5 issue an AN-specific signalling exchange with the UE 802 that is related with the information received from SF 808. The (R)AN 804 may forward the NAS message received in operation 4 to the UE 802. In some embodiments, if the PDU Session modification was requested by the UE 802, the (R)AN 804 may provide the NAS message to the UE 802 only if the necessary RAN resources related to the modified PDU Session are established and the allocation of (R)AN tunnel information, if any, is successful. The UE 802 may acknowledge the PDU Session Modification Command by sending another NAS message. This NAS message may include the PDU Session ID and another N1 SM container message. The other N1 SM container message may contain a PDU Session Modification Command Ack.

The (R)AN 804 may at operation 6 acknowledge the N2 PDU Session Request by sending to the AMF 806 a N2 PDU Session Ack Message that includes a N2 SM information, NAS message, and User location Information. The N2 SM information may include the QFI(s), RAN tunnel information, and PDU Session ID.

The AMF 806 may at operation 7 forward the N2 SM information, the User location Information and the N1 SM container that contains the PDU Session Modification Command Ack received from the AN to the SMF 808 via a Nsmf_PDUSession_UpdateSMContext service operation.

The SMF 808 at operation 8 may update N4 session of the UPF(s) 810 that are involved by the PDU Session modification by sending a N4 Session Modification Request message containing the N4 Session ID to the UPF 810. The SMF 808 may thus set the packet filters of the UPF 810 to add the separate QoS flow requested by the UE 802 for the SDF(s) or to bind the SDF(s) to an existing QoS flow.

If the SMF 808 interacted with the PCF 812, the SF 808 may notify the PCF 812 whether the PCC decision could be enforced or not by invoking Nsmf_EventExposure_Notify service operation. The Nsmf_EventExposure_Notify service operation may report a UE PDU Session related event to the PCF 812 that has subscribed to the event report service. The SMF 808 may also notify any entity that has subscribed to User Location Information related with PDU Session change.

After the PDU Session modification has been performed, DL user traffic may be transmitted to the UE and UL user traffic may be transmitted from the UE. The 5G User plane contains the protocol stack layers PHY, MAC, RLC, PDCP in addition to a new Service Data Adaptation Protocol (SDAP) layer. The main services and functions of the SDAP layer include the mapping between a QoS flow and a data radio bearer and marking the QoS flow ID (QFI) in both DL and UL packets. In DL this may be due to reflective QoS and in UL this may be due to the QoS framework. In general, a single protocol entity of SDAP may be configured for each individual PDU session, except for DC in which two entities can be configured. In reflective mapping for each DRB, the UE may monitor the QFI(s) of the DL packets and apply the same mapping in for UL packet; that is, for a DRB, the UE may map the UL packets belonging to the QoS flows(s) corresponding to the QFI(s) and PDU Session observed in the DL packets for that DRB. To enable reflective mapping, the NG-RAN may mark DL packets between the UE and the NG-RAN with the QFI. Alternatively, the NG-RAN may configure by RRC an uplink "QoS Flow to DRB mapping".

This UE may thus identify specific DL traffic by relying only on the QFI (i.e. without prior packet header inspection). The UE may thus read the SDAP header. The SDAP layer is a level 2 layer whose PDU packets may contain a SDAP service data unit (SDU) and SDAP header. The SDAP header may contain the QFI. The modem may read the QFI prior to deciphering the PDCP PDU as the QFI in the SDAP header is not encrypted (i.e., sent as clear text). As processing in user plane is byte aligned, in some embodiments the byte containing QFI field is not encrypted. In other embodiments, the entire SDAP header may not be encrypted if the maximum size of SDAP header is a single byte.

In another embodiment, the CN can indicate to the RAN that a different DRB is to be used for the QFI. In this case, DRB-level distinction of traffic at the UE may allow different treatment of the packets on the QFI (i.e., routed to the modem or to the AP). DRB-level distinction may be used when SDAP header information is not included or is encrypted.

Examination of the QFI by the UE may allow the UE to segregate low-volume traffic that is terminated at the lower layers from ultra-high bandwidth traffic that is consumed by upper layers. Examples of traffic that is terminated at the lower layers may include connections for OMA DM provisioning or the Bearer Independent Protocol. Another example is software that is pre-installed by device manufacturers or network operators, designed to gather, store and forward measurements on their behalf. Such information may include performance data on voice and data connectivity over the radio interface.

In some embodiments, the UE may be limited to a single QoS Flow for traffic segregation. In this case, if UE makes subsequent requests for segregation of additional SDF(s), the additional SDF(s) may be multiplexed on the existing QoS Flow that is used for segregation.

In some embodiments, a similar PDU Session modification procedure may be used during home-routed roaming. In this case, the visiting SMF (V-SMF) may communicate with the home SMF (H-SMF) when the UE requests the new QoS flow. The V-SMF may invoke an Nsmf_PDUSession_Update Request (SUPI, PDU Session ID, UE request for PDU Session modification or the QoS modification request from the VPLMN, UE location information, Time Zone, Access Type) service operation to inform the H-SMF to update the PDU Session. The H-SMF may respond to the request and the V-SMF may, based on the response, establish the new QoS flow for the SDF(s) or bind the SFD(s) to an existing QoS flow and set the associated packet filters at the V-UPF.

EXAMPLES

Example 1 is an apparatus of a user equipment (UE), the apparatus comprising: processing circuitry arranged to: determine that a service data flow (SDF) of a packet data unit (PDU) session is to have a specific Quality of Service (QoS); initiate a PDU Session modification procedure for the SDF by transmission of a non-access stratum (NAS) message to a network, the NAS message comprising an identification of the PDU session, an identification of the specific QoS and a segregation indication that recommends that the network establish a QoS flow for the SDF that is separate from existing QoS flows; and modify resources related to the PDU session based on a PDU Session Modification Command from the network, the PDU Session Modification Command indicating whether the QoS flow for the SDF has been segregated by the network; and a memory configured to store QoS rules for the QoS flow.

In Example 2, the subject matter of Example 1 includes, wherein the segregation indication indicates a request to separate the SDF on a distinct QoS flow even if an existing QoS flow is able to support the specific QoS.

In Example 3, the subject matter of Examples 1-2 includes, wherein the NAS message further comprises a set of packet filters that describes the SDF and a requested operation on the packet filter.

In Example 4, the subject matter of Examples 1-3 includes, wherein: the NAS message is transmitted to an Access and Mobility Function (AMF) of the network, and the PDU Session Modification Command is received from the AMF, the PDU Session Modification Command comprising a QoS rule, QoS Flow level QoS parameters for the QoS flow associated with the QoS rule and corresponding QoS rule operation and a QoS Flow level QoS parameters operation to notify the UE that one or more QoS rules were added, removed or modified.

In Example 5, the subject matter of Examples 1-4 includes, wherein the specific QoS for the SDF is indicated in the NAS message as a QoS Flow Identifier (QFI) of an existing QoS flow on which the SDF is to be added.

In Example 6, the subject matter of Example 5 includes, wherein the QFI is in a Service Data Adaptation Protocol (SDAP) header of the NAS message, and the QFI is not encrypted.

In Example 7, the subject matter of Example 6 includes, wherein the SDAP header is not encrypted.

In Example 8, the subject matter of Examples 6-7 includes, wherein the processing circuitry is further arranged to segregate packets to be processed by different processors based on the QFI, the packets processed by an appropriate one of the different processors after segregation.

In Example 9, the subject matter of Examples 1-8 includes, QI).

In Example 10, the subject matter of Examples 5-9 includes, wherein the specific QoS for the SDF is indicated in the NAS message further using a Guaranteed Bit Rate (GBR).

In Example 11, the subject matter of Examples 1-10 includes, wherein the processing circuitry comprises: a baseband processor configured to encode transmissions to, and decode transmissions from, the network.

Example 12 is an apparatus of an Session Management Function (SMF) of a network, the apparatus comprising: processing circuitry arranged to: determine whether to segregate a service data flow (SDF), having a specific Quality of Service (QoS), on a distinct QoS flow of a packet data unit (PDU) session for a user equipment (UE) based on a request, in a UE-initiated modification of the PDU session, that the network establish a QoS flow for the SDF that is separate from existing QoS flows; generate, for communication to a User Plane Function (UPF) of the network, an update based on a determination whether to segregate the QoS flow, the update indicating a manner for the UPF to handle data for the UE on the SDF; and generate, for communication to the UE, an indication of a manner for the UE to handle data on the SDF based on the determination; and a memory configured to store the request.

In Example 13, the subject matter of Example 12 includes, wherein the processing circuitry is further arranged to make the determination whether to separate the QoS flow for the SDF independent of whether an existing QoS flow is able to support the specific QoS.

In Example 14, the subject matter of Examples 12-13 includes, wherein: the indication of a manner for the UE to handle data on the SDF comprises a PDU Session Modification Command, the PDU Session Modification Command comprising a QoS rule, QoS Flow level QoS parameters for the QoS flow associated with the QoS rule and corresponding QoS rule operation and a QoS Flow level QoS parameters operation to notify the UE that one or more QoS rules were added, removed or modified.

In Example 15, the subject matter of Examples 12-14 includes, wherein the request comprises a non-access stratum (NAS) message that comprises an identification of the PDU session, an identification of the separate QoS, a set of packet filters that describes the SDF, a requested operation on the set of packet filters and a segregation indication that requests that the network establish the separate QoS flow for the SDF.

In Example 16, the subject matter of Example 15 includes, QI).

In Example 17, the subject matter of Example 16 includes, wherein the specific QoS for the SDF is indicated in the NAS message further using a Guaranteed Bit Rate (GBR).

In Example 18, the subject matter of Example 17 includes, wherein the specific QoS for the SDF is indicated in the NAS message as a QoS Flow Identifier (QFI) of an existing QoS Flow on which the SDF is to be added.

In Example 19, the subject matter of Example 18 includes, wherein the QFI is in a Service Data Adaptation Protocol (SDAP) header of the NAS message, and the QFI is not encrypted.

In Example 20, the subject matter of Example 19 includes, wherein the SDAP header is not encrypted.

Example 21 is a computer-readable storage medium that stores instructions for execution by one or more processors of a user equipment (UE), the one or more processors to configure the UE to, when the instructions are executed: initiate a PDU Session modification procedure for a service data flow (SDF) of a packet data unit (PDU) session by transmission of a non-access stratum (NAS) message to a network, the NAS message comprising: an identification of the PDU session, an identification of a specific QoS for the SDF, a set of packet filters that describes the SDF, a requested operation on the packet filter, and a segregation indication that requests that the network establish a QoS flow for the SDF that is separate from existing QoS flows even if an existing QoS flow is able to support the specific QoS; and modify resources related to the PDU session based on a PDU Session Modification Command from the network, the PDU Session Modification Command indicating whether the network has created a separate QoS flow for the SDF.

In Example 22, the subject matter of Example 21 includes, wherein: the NAS message is transmitted to an Access and Mobility Function (AMF) of the network, and the PDU Session Modification Command is received from the AMF, the PDU Session Modification Command comprising a QoS rule, QoS Flow level QoS parameters for the QoS flow associated with the QoS rule and corresponding QoS rule operation and a QoS Flow level QoS parameters operation to notify the UE that one or more QoS rules were added, removed or modified.

In Example 23, the subject matter of Examples 21-22 includes, wherein the specific QoS is indicated in the NAS message as a QoS Flow Identifier (QFI) of an existing QoS Flow on which the SDF is to be added.

In Example 24, the subject matter of Example 23 includes, wherein the QFI is in a Service Data Adaptation Protocol (SDAP) header of the NAS message, and the SDAP header is not encrypted.

In Example 25, the subject matter of Examples 21-24 includes, wherein instructions, when executed, further configure the UE to segregate packets to be processed by different processors based on the QFI, the packets processed by an appropriate one of the different processors after segregation.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25.

Example 29 is a method to implement of any of Examples 1-25.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
   one or more processors configured to cause a user equipment (UE) to:
     determine that a service data flow (SDF) of a protocol data unit (PDU) session is to have a specific Quality of Service (QoS); and
     initiate a PDU session modification procedure for the SDF by transmission of a non-access stratum (NAS) message to a network, the NAS message comprising an identification of the PDU session, a requested QoS and a segregation indication that recommends that the network use a distinct QoS flow for the SDF, wherein the UE has an existing QoS flow that supports the requested QoS.

2. The apparatus of claim 1, wherein the one or more processors are further configured to cause the UE to:
   modify resources related to the PDU session based on a PDU Session Modification Command from the network, the PDU Session Modification Command indicating whether the SDF has been segregated by the network on the distinct QoS flow.

3. The apparatus of claim 2, wherein:
   the NAS message is transmitted to an Access and Mobility Function (AMF) of the network, and
   the PDU Session Modification Command is received from the AMF, the PDU Session Modification Command comprising a QoS rule for the distinct QoS flow.

4. The apparatus of claim 3, the apparatus further comprising:
   a memory configured to store the QoS rule for the distinct QoS flow.

5. The apparatus of claim 1, wherein the NAS message further comprises a set of packet filters that describes the SDF and a requested operation on a first packet filter of the set of packet filters.

6. The apparatus of claim 1, wherein the specific QoS for the SDF is indicated in the NAS message as a QoS Flow Identifier (QFI) of the existing QoS flow on which the SDF is to be added.

7. The apparatus of claim 6, wherein the specific QoS for the SDF is indicated in the NAS message further using a Guaranteed Bit Rate (GBR).

8. The apparatus of claim 6, wherein the QFI is in a Service Data Adaptation Protocol (SDAP) header of the NAS message, and the QFI is not encrypted.

9. The apparatus of claim 8, wherein the SDAP header is not encrypted.

10. The apparatus of claim 8, wherein the one or more processors are further configured to cause the UE to segregate packets to be processed by different processors based on the QFI, the packets processed by an appropriate one of the different processors after segregation.

11. The apparatus of claim 1, wherein the specific QoS for the SDF is indicated in the NAS message using a 5th Generation QoS Indicator (5QI).

12. The apparatus of claim 1, wherein the one or more processors comprise:
a baseband processor configured to encode transmissions to, and decode transmissions from, the network.

13. An apparatus, comprising:
one or more processors configured to cause an Access Management Function (AMF) to:
receive a non-access stratum (NAS) message from a user equipment (UE), the NAS message comprising an identification of a protocol data unit (PDU) session, a requested QoS and a segregation indication that recommends that the network use a distinct QoS flow for a service data flow (SDF) of the PDU session, wherein the UE has an existing QoS flow that supports the requested QoS;
in response to the NAS message, invoke a Nsmf_P-DUSession_UpdateSMContext operation.

14. The apparatus of claim 13, further comprising:
a memory configured to store the NAS message.

15. The apparatus of claim 13, wherein the one or more processors are further configured to cause the AMF to make the determination whether to implement the PDU session modification procedure independent of whether the existing QoS flow is able to support a specific QoS for the SDF of the PDU session.

16. The apparatus of claim 13, wherein the specific QoS for the SDF is indicated in the NAS message using a 5th Generation QoS Indicator (5QI) and a Guaranteed Bit Rate (GBR).

17. The apparatus of claim 13,
wherein the specific QoS for the SDF is indicated in the NAS message as a QoS Flow Identifier (QFI) of the existing QoS Flow on which the SDF is to be added,
wherein the QFI is in a Service Data Adaptation Protocol (SDAP) header of the NAS message, the QFI is not encrypted, and wherein the SDAP header is not encrypted.

18. The apparatus of claim 13,
wherein the indication of the manner for the UE to handle data on the SDF comprises a PDU Session Modification Command, the PDU Session Modification Command indicating whether the SDF has been segregated by the network on the distinct QoS flow, and
wherein the PDU Session Modification Command comprises a QoS rule for the distinct QoS flow.

19. The apparatus of claim 13, wherein the NAS message further comprises a set of packet filters that describes the SDF and a requested operation on the set of packet filters.

20. An apparatus of a Session Management Function (SMF) of a network, the apparatus comprising:
processing circuitry arranged to:
determine whether to segregate a service data flow (SDF), having a specific Quality of Service (QoS), on a distinct QoS flow of a protocol data unit (PDU) session for a user equipment (UE) based on a request, in a UE-initiated modification of the PDU session, that the network establish a QoS flow for the SDF that is separate from existing QoS flows;
generate, for communication to a User Plane Function (UPF) of the network, an update based on a determination whether to segregate the QoS flow, the update indicating a manner for the UPF to handle data for the UE on the SDF; and
generate, for communication to the UE, an indication of a manner for the UE to handle data on the SDF based on the determination.

* * * * *